US012700603B2

(12) United States Patent (10) Patent No.: US 12,700,603 B2
Mutolo et al. (45) Date of Patent: Aug. 4, 2026

(54) SYSTEMS FOR CONVERTING AND STORING ENERGY

(71) Applicant: STANDARD HYDROGEN CORPORATION, Albany, NY (US)

(72) Inventors: Paul F. Mutolo, Albany, NY (US);
William W. Dailey, Albany, NY (US);
Gary P. Stottler, Albany, NY (US);
Daniel B. O'Connell, Albany, NY (US)

(73) Assignee: Standard Hydrogen Corporation,
Albany, NY (US)

( * ) Notice: Subject to any disclaimer, the term of this
patent is extended or adjusted under 35
U.S.C. 154(b) by 252 days.

(21) Appl. No.: 17/240,397

(22) Filed: Apr. 26, 2021

(65) Prior Publication Data

US 2022/0344691 A1 Oct. 27, 2022

(51) Int. Cl.
H01M 8/0656 (2016.01)
C25B 1/04 (2021.01)
(Continued)

(52) U.S. Cl.
CPC ............ H01M 8/0656 (2013.01); C25B 1/04
(2013.01); C25B 9/00 (2013.01); C25B 15/08
(2013.01);
(Continued)

(58) Field of Classification Search
CPC . C25B 1/04; C25B 9/00; C25B 15/08; H01M
8/04201; H01M 8/04455;
(Continued)

(56) References Cited

U.S. PATENT DOCUMENTS 5,346,778 A * 9/1994 Ewan ................ H01M 8/04552
429/515
6,265,092 B1 7/2001 Meltser et al.
(Continued)

FOREIGN PATENT DOCUMENTS

JP 2004071487 A * 3/2004
WO WO-2018194182 A1 * 10/2018 ............. B01D 59/40

OTHER PUBLICATIONS

Larminie, James. "Fuel Cell Systems Explained. Appendix 2: Useful Fuel Cell Equations" John Wiley & Sons. Ltd google schola 2 (2003): 395-400 (Year: 2003).*

(Continued)

*Primary Examiner* — Tiffany Legette
*Assistant Examiner* — Jared Hansen
(74) *Attorney, Agent, or Firm* — Victor Cardona, Esq;
Heslin Rothenberg Farley & Mesiti P.C.

(57) ABSTRACT

The present invention provides, in a first aspect, an electrical generation system which includes an electrolyzer and a fuel cell system. The electrolyzer is coupled to a source of water and a power source. The electrolyzer is configured to generate oxygen and hydrogen utilizing water from the water source and electrical power from the power source. The fuel cell system is coupled to the electrolyzer to receive a flow of the hydrogen from the electrolyzer at an anode thereof. The fuel cell system includes a cathode having a cathode chamber coupled to a source of ambient air. The cathode chamber is coupled to the electrolyzer to selectively allow a flow of the oxygen from the electrolyzer to the cathode chamber and to selectively allow a flow of air from the source of ambient air to the cathode chamber. The fuel cell system is configured to generate electricity in a fuel cell reaction utilizing the hydrogen and the oxygen.

8 Claims, 2 Drawing Sheets

(51) Int. Cl.

| | |
|---|---|
| *C25B 9/00* | (2021.01) |
| *C25B 15/08* | (2006.01) |
| *H01M 8/04082* | (2016.01) |
| *H01M 8/0444* | (2016.01) |
| *H01M 8/04746* | (2016.01) |
| *H01M 16/00* | (2006.01) |

(52) U.S. Cl.
CPC ... *H01M 8/04201* (2013.01); *H01M 8/04455* (2013.01); *H01M 8/04753* (2013.01); *H01M 16/003* (2013.01); *H01M 2250/10* (2013.01)

(58) Field of Classification Search
CPC .......... H01M 8/04753; H01M 8/0656; H01M 16/003; H01M 2250/10; Y02E 60/50
See application file for complete search history.

(56) References Cited

U.S. PATENT DOCUMENTS

| | | | | |
|---|---|---|---|---|
| 7,233,079 | B1 * | 6/2007 | Cooper | H02J 3/381 |
| | | | | 290/55 |
| 2004/0096709 | A1 | 5/2004 | Darling et al. | |
| 2004/0131902 | A1 * | 7/2004 | Frank | C25B 15/02 |
| | | | | 204/266 |
| 2008/0060935 | A1 * | 3/2008 | Hartvigsen | H01M 8/0656 |
| | | | | 204/242 |
| 2008/0145730 | A1 | 6/2008 | Takaki et al. | |
| 2009/0098427 | A1 | 4/2009 | Reiser | |
| 2011/0189556 | A1 * | 8/2011 | Boersma | H01M 8/0668 |
| | | | | 422/600 |
| 2013/0052545 | A1 * | 2/2013 | Okuyoshi | H01M 8/04492 |
| | | | | 429/400 |
| 2014/0004438 | A1 | 1/2014 | Wake et al. | |
| 2014/0034187 | A1 | 2/2014 | Farchmin et al. | |
| 2015/0068630 | A1 | 3/2015 | Libis et al. | |
| 2016/0024666 | A1 | 1/2016 | Bahar et al. | |
| 2016/0083855 | A1 * | 3/2016 | Herold | C25B 15/08 |
| | | | | 205/628 |
| 2019/0245224 | A1 * | 8/2019 | Lacroix | C25B 15/08 |
| 2021/0119231 | A1 * | 4/2021 | Nakamuta | H01M 8/04201 |

OTHER PUBLICATIONS

JP2004071487A, Nonomura, "Distributed power generation system", machine English translation retrieved from https://translate.google.com Date: Dec. 11, 2024 (Year: 2004).*

WO2018194182a1, Hisayoshi, et al. "Method for producing hydrogen isotope enriched water or aqueous solution, and method and device for producing hydrogen gas . . . ", machine English translation retrieved from https://worldwide.espacenet.com/ Date: Dec. 11, 2024 (Year: 2018).*

International Search Report and Written Opinion dated Dec. 7, 2022, 17 pp.

\* cited by examiner

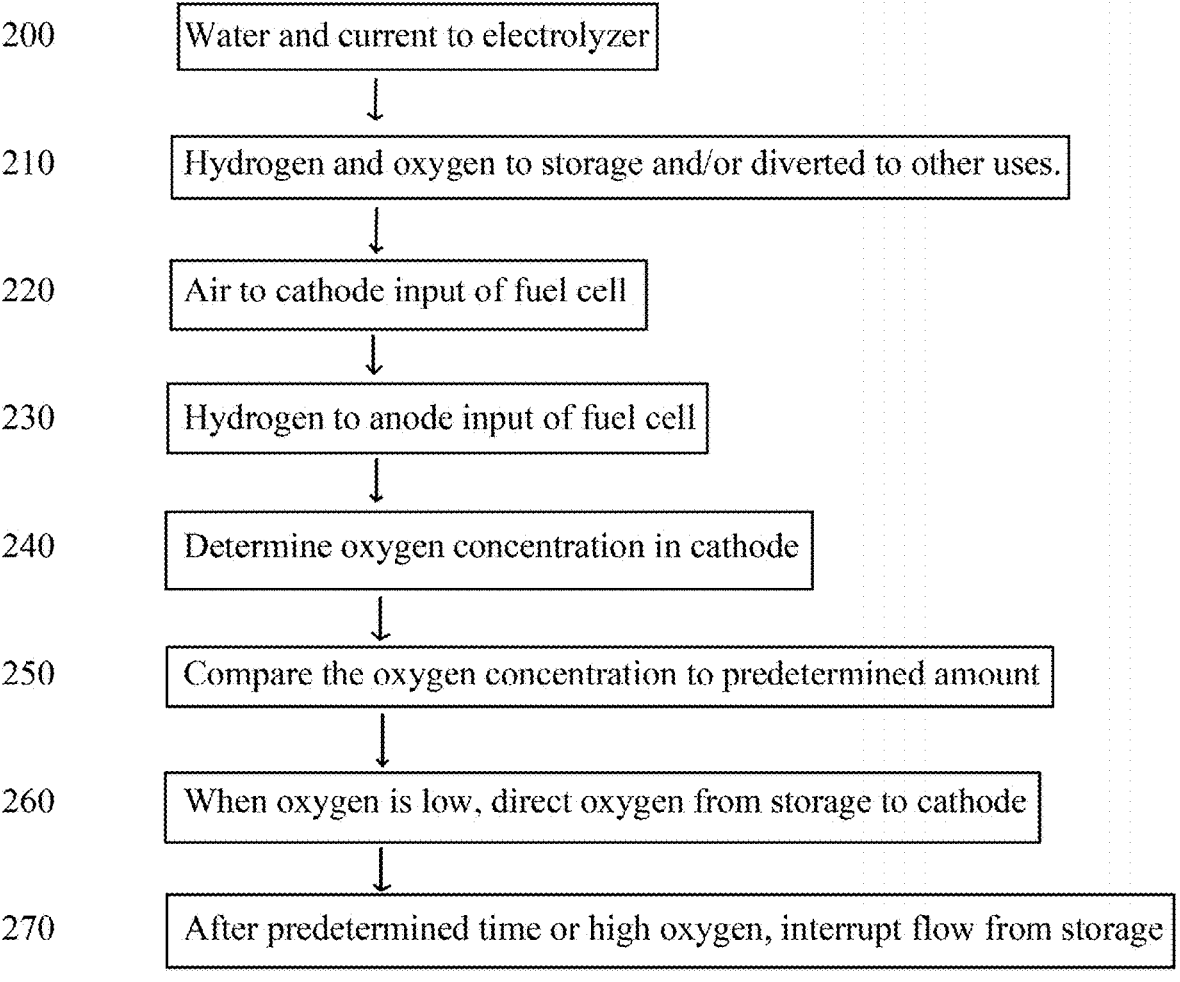

200    Water and current to electrolyzer

210    Hydrogen and oxygen to storage and/or diverted to other uses.

220    Air to cathode input of fuel cell

230    Hydrogen to anode input of fuel cell

240    Determine oxygen concentration in cathode

250    Compare the oxygen concentration to predetermined amount

260    When oxygen is low, direct oxygen from storage to cathode

270    After predetermined time or high oxygen, interrupt flow from storage

*FIG. 2*

SYSTEMS FOR CONVERTING AND STORING ENERGY

TECHNICAL FIELD

This invention relates in general to electrochemical systems, and more particularly to systems and methods for electrochemically storing and converting energy.

BACKGROUND OF THE INVENTION

Fuel cells electrochemically convert fuels and oxidants to electricity and heat. Fuel cells and systems that employ them can be employed in, inter alia, stationary grid based systems, stationary off-grid systems, transportation systems including automotive, nautical and aerospace applications, and in residential, industrial and military environments as either a primary or redundant power source. It is of great benefit that fuel cell systems can operate at very low noise levels and without toxic emissions.

The predominant type of fuel cell deployed in each of these industries is the polymer electrolyte membrane (PEM) fuel cell. PEM fuel cells are also the primary technology of choice for use in developing markets, such as over the road transportation, energy storage, among others. Currently, commercial PEM fuel cells operate with a polymer electrolyte designed to conduct hydrogen or hydronium ions (H+ or H3O+). In the future, PEM fuel cells comprised of a polymer electrolyte designed to conduct hydroxide ions (OH—) are expected to be commercialized, and be deployed for some or all of these applications. In all cases of interest to this invention, a PEM fuel cells are operated on hydrogen fuel (provided at the negative electrode, or anode), and air as the source of the oxidant (oxygen) (provided at the positive electrode, or cathode). There are various reasons that only the fuel (hydrogen) is connected to the fuel cell device, while the oxidant is extracted from the surrounding ambient air. Providing oxygen in a separate container where suitable air is not readily available (such as in aerospace or submarine environments), can be challenging based on economics, safety, engineering complexity (space, weight). Therefore, most fuel cell systems rely on an "air breathing" cathode, which extracts oxygen from the ambient environment. Compressors may also be used to overcome a relatively low concentration of oxygen in the air as they increase the pressure of the air in a cathode chamber of the cathode, and thereby also increase the partial pressure of oxygen, relative to ambient conditions. The power output of a fuel cell and the efficiency of a fuel cell can each be changed by varying the availability of either the fuel or the oxidant as determined by the mode of operation.

Hydrogen fuel for a fuel cell may be produced in various ways including a hydrogen reformer using methane (i.e., natural gas) as an input, a hydrogen reformer using methanol as an input, or an electrolyzer which produces hydrogen and oxygen by electrically splitting water.

An electrolyzer traditionally has not been considered an efficient means of producing hydrogen to be supplied to a fuel cell for the production of electricity due to the electrical power needs for producing hydrogen and oxygen by such an electrolytic process. The use of an electrolyzer with a fuel cell to generate hydrogen to store energy to be converted in a fuel cell has round trip efficiency losses that are that render the system inefficient as measured by the conservation of energy. In particular, the electricity used for electrolysis would not be recovered to an acceptable degree by the operation of the fuel cell to generate electricity from the electrolytically generated hydrogen. However, in a commercial setting where the cost of electricity varies, it is possible to use a system that employs an electrolyzer, hydrogen storage, and a fuel cell to generate electricity in a manner that is economically efficient and economically beneficial.

Thus, there is a need for improved fuel cell systems and improved methods of producing and storing fuel and oxidant for such fuel cells to improve operational efficiency measured from an economic perspective.

SUMMARY OF THE INVENTION

The present invention provides, in a first aspect, an electrical energy generation and storage system which includes an electrolyzer, a storage plenum, and a fuel cell system. The electrolyzer is coupled to a source of water and a power source. The electrolyzer is configured to generate oxygen and hydrogen utilizing water from the water source and electrical power from the power source. The fuel cell system is fluidically coupled to the electrolyzer to receive a flow of the hydrogen from the electrolyzer at an anode thereof. The fuel cell system includes a cathode having a cathode chamber coupled to a source of ambient air. The cathode chamber is coupled to the electrolyzer to selectively allow a variable flow of the oxygen from the electrolyzer to the cathode chamber and to selectively allow a flow of air from the source of ambient air to the cathode chamber. The fuel cell system is configured to generate electricity in a fuel cell reaction utilizing the hydrogen and the oxygen.

The present invention provides, in a second aspect, a method for use in generating electricity which includes generating hydrogen and oxygen using an electrolyzer. The electrolyzer is coupled to a fuel cell to provide the hydrogen to an anode of the fuel cell. Ambient air is provided to a cathode chamber of a cathode of the fuel cell. Electrical current is generated using the hydrogen and the ambient air in a reaction in the fuel cell The oxygen generated by the electrolyzer is provided to the cathode chamber to change a concentration of an oxidant in the cathode chamber to increase an amount of the electrical current and power produced by the fuel cell.

The present invention provides, in a third aspect, a method for use in generating electricity which includes generating hydrogen and oxygen using an electrolyzer. The electrolyzer is coupled to a fuel cell to provide the hydrogen to an anode of the fuel cell. Ambient air is provided to a cathode chamber of a cathode of the fuel cell. Electrical current is generated using the hydrogen and the ambient air in a reaction in the fuel cell. The oxygen is provided to the cathode chamber to change a concentration of an oxidant in the cathode chamber to allow for more complete oxidation of the hydrogen and thus decrease the amount of hydrogen required at the anode such that the fuel cell provides the same level of electrical current produced under the condition of no added oxygen, allowing for an increase in fuel cell efficiency, and overall efficiency of the system.

The present invention provides in a fourth aspect, a fuel generation and an electrical generation system which includes an electrolyzer coupled to a source of water and power and configured to generate both hydrogen and oxygen. A fuel cell system is coupled to the electrolyzer to receive a flow of the hydrogen from the electrolyzer (either directly, or via a storage plenum) and an cathode thereof. The fuel cell system includes a cathode chamber of a cathode coupled to a source of ambient air. The flow of air may be interrupted The cathode chamber of the cathode of fuel cell system is fluidically coupled to the electrolyzer and configured to selectively allow a flow of the oxygen from the electrolyzer to the cathode chamber and to selectively allow a flow of air from the source of ambient air. The fuel cell is configured to generate electricity in a fuel cell reaction utilizing the hydrogen and the oxygen. It is within the scope of the invention to include on or more storage plenuma and associated equipment to store pressurized hydrogen and/or pressurized oxygen for use that is not contemporaneous with the operation of the electrolyzer. In addition to reaction in a fuel cell, hydrogen that is generated by electrolyzer may be used or stored for one or more of the following: to provide, without limitation a filling flow of hydrogen from the filling station to a hydrogen tank of a vehicle; injection into a natural gas stream; or collection into a second plenum, removable from the overall system for transportation to another location.

BRIEF DESCRIPTION OF THE DRAWINGS

The subject matter which is regarded as the invention is particularly pointed out and distinctly claimed in the claims at the conclusion of the specification. The foregoing and other features and advantages of the invention will be readily understood from the following detailed description of the preferred embodiments taken in conjunction with the accompanying drawings in which:

FIG. 2 is a flowchart of a method for generating fuel and oxidant and generating electricity from the fuel and oxidant.

DETAILED DESCRIPTION

Figure 1:
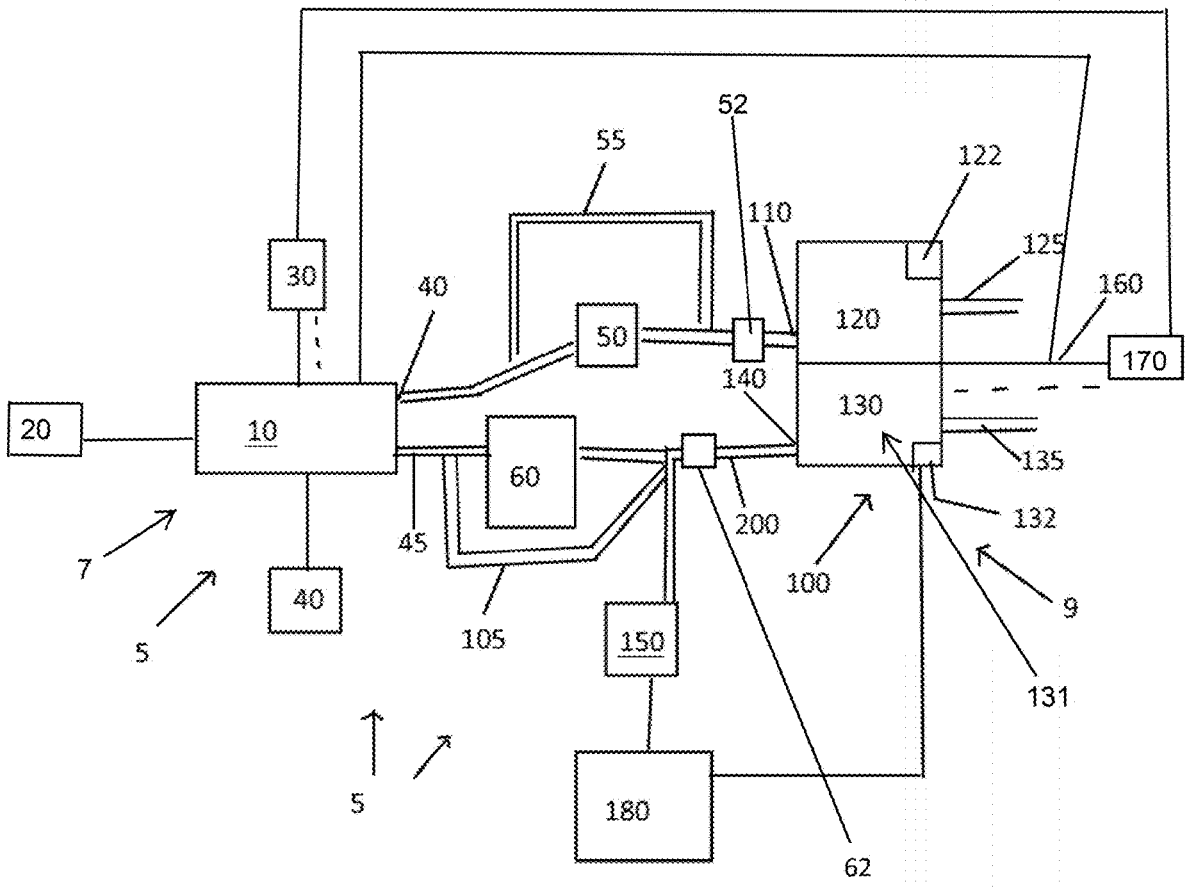
FIG. 1 is a block diagram of a system for generating fuel and oxidant and for generating electricity.

In accordance with the principles of the present invention, electrochemical fuel generation, energy storage, and electricity generation systems and methods are provided.

As depicted in FIG. 1, a system 5 for generating and storing fuel and oxidant and for generating electricity may include a fuel generating system 7 and an electricity generating system 9.

Fuel generating system 7 could include an electrolyzer 10, which may be connected to a source 20 of water and an electrical power source 30 (e.g, a DC power source). Electrolyzer 10 may be a PEM type (including H+ conducting (acidic) PEM or OH— conducting (alkaline) PEM) or a traditional alkaline type (non-PEM). Electricity generating system 9 may include a fuel cell subsystem 100, such as a H+ conducting or OH— conducting PEM fuel cell, Solid Oxide Fuel Cell, a Phosphoric acid fuel cell, molten carbonate fuel cell, or a combustion turbine designed to combust hydrogen, for example.

A hydrogen outlet 40 of electrolyzer 10 may be connected to a hydrogen storage tank 50 (e.g., via an appropriate conduit for transmitting gaseous hydrogen) which may be connected to a hydrogen fuel input 110 on an anode 120 of fuel cell subsystem 100. Additionally, hydrogen outlet 40 could be connected to hydrogen fuel input 110 via a bypass 55. This method of operation is consistent with being able to simultaneously charge and discharge subsystem 100 simultaneously. The invention may include a compressor (e.g., a compressor 52) between electrolyzer 10 and hydrogen fuel input 110 as necessary or desirable based on the requirements of the system. Hydrogen fuel input 110 may be connected to hydrogen storage tank 50, which will typically be maintained at positive pressure.

For example, bypass 55 could be of sufficient size to act as a lower pressure hydrogen storage plenum with such pressure generated entirely from the output of electrolyzer 10, and which could be used to release hydrogen into fuel cell subsystem 100 via hydrogen input 110 to anode 120 of the fuel cell, or via a separate conduit (not shown). Similarly oxygen generated in electrolyzer 10 could be stored in an oxygen bypass (e.g., a bypass 105) of sufficient size to allow for a lower pressure storage of oxygen (though still greater than ambient atmospheric pressure) and such oxygen in the bypass maybe released into fuel cell subsystem 100 via an oxygen input 140 on a cathode chamber 131 of cathode 130 of fuel cell 100. These methods of operations are consistent with being able to charge and discharge the system simultaneously, and may be useful for maintaining or enhancing system efficiency when relatively low volumes of hydrogen are required to meet a load drawn from fuel cell subsystem 100.

An oxidant outlet 45 of electrolyzer 10 may exhaust an oxidant (e.g., oxygen) therefrom and may be connected (e.g., via an appropriate conduit for transmitting a gaseous oxidant) to an oxidant storage tank 60 which may be connected to oxidant input 140 on cathode 130 of fuel cell 100. Alternatively, oxidant outlet 45 could be connected to oxidant input 140 via bypass 105 or directly to oxidant input 140 in an example without a oxidant storage tank (e.g., oxidant storage tank 60). Alternatively, oxidant outlet 45 may vent the oxidant to the surroundings, during times when the oxidant is not in demand by the storage tank 60 or the fuel cell 100, via a safe exhaust conduit, not shown. A compressor 62 may be located between electrolyzer 10 oxidant input 140 as necessary or desirable based on the requirements of the system. Oxidant input 140 may be connected to the oxidant storage tank 60, which will typically be maintained at positive pressure.

Cathode 130 (e.g., cathode chamber 131 thereof) may be connected to an ambient air source 150 via oxidant input 140, and during normal operation, fuel cell 100 may be connected to the ambient air source such that ambient air provides an oxidant, and hydrogen from hydrogen storage tank 50 provided by electrolyzer 10 provides a fuel, for a fuel cell reaction of fuel cell 100 to generate electricity. A compressor (e.g., compressor 62) or other flow control device may be disposed between cathode 130 and ambient air source 150. Such a fuel cell reaction may result in a gas with reduced oxidant, water and heat at a cathode outlet 135 (e.g., connected to chamber 131) and an effluent of reduced hydrogen content and heat at an anode outlet 125, along with a DC power being produced and connected to an electrical output 160 to connect to a load 170, such as to charge a grid tied battery or a battery of any electrical vehicle, or to electrically power any other electrical load. Further electrical output 160 may be electrically connected to electrolyzer 10.

Electricity from electric power source 30 may also bypass, or partially bypass, system 5 in order to provide electricity to a load (e.g., load 170), for example to charge a battery. By doing so, the battery could be charged using either the electric power source, or system 5, depending on the conditions required by electric power source 30, and in a manner that is consistent with efficient charging of batteries (e.g., such as those in electric vehicles) without incurring the efficiency losses associated with generating hydrogen with electrolyzer 10 and immediately porting such hydrogen to fuel cell 100 in order to generate current. Power from the electrical power source 30 may be either alternating current or direct current, depending on the setting, and the power source. It is within the scope of the invention that power source 30 may include or be connected to a rectifier or inverter (not shown) to convert power into either alternating or direct current. If it is not possible or desirable to draw power from the power source 30 due to economic or other conditions system 5 may provide current to critical loads (e.g., load 170) without diminishing the effectiveness of electric power source 30.

The above indicated connections between components of system 5 may utilize appropriate conduits, valves, pumps and compressors where necessary to transmit fuel (e.g., hydrogen) and oxidant (e.g., oxygen, ambient air) between various components of the system and/or compress such fuel and oxidants. Those skilled in the art will recognize that these elements may be algorithmically controlled (e.g., via a controller) and or actuated using methods known to those skilled in the art In an example, oxidant may be provided from oxidant storage tank 60 to cathode input 140 to supplement or substitute for ambient air at cathode input 140. Such oxidant may be provided to increase fuel cell activity and corresponding electrical output (i.e., at electrical output 160) of the fuel cell 100. Alternatively the increased oxygen concentration may be used to increase an efficiency of reactions in fuel cell 100, allowing for more efficient use of hydrogen (i.e., reductant). Typically, during operation, fuel cells (e.g., PEM fuel cells) may be cathode limited, i.e., a reaction at the cathode limits the power output and the efficiency. Typically, ambient air, having an oxygen content of about 21 percent, provides an oxidant necessary for a cathode side (e.g., cathode 130) of a fuel cell reaction. This concentration of oxygen provides a mass flow of oxygen which limits the fuel cell reactions for the given amount of hydrogen supplied. Thus, when fuel cell reactions are limited by the amount of oxidant supplied to a cathode (e.g., cathode 130) of a fuel cell (e.g., fuel cell 100), an increase in an amount of oxidant to the cathode (e.g., cathode chamber 131 of cathode 130) of a fuel cell (e.g., fuel cell 100), as described above when providing oxygen from electrolyzer 10 to cathode input 140 of cathode 130 of fuel cell 100, enhances the reaction rate and increases the potential electrical output of such fuel cell and system 5. More specifically, an increase in a concentration of oxygen, relative to ambient air, may be provided to cathode input 140 of cathode 130 of fuel cell 100 to provide such an increase in electrical energy output from fuel cell 100 per unit time, given a same amount of hydrogen available at anode 120 of fuel cell 100. Correspondingly, in a situation where more current is not required from a fuel cell (e.g. fuel cell 100), the existing hydrogen may be reduced without diminishing the current produced by fuel cell 100 or system 5.

Thus, by injecting, on at least an occasional basis, some volume of $O_2$ to create a higher concentration of $O_2$ that is higher than that found in ambient air, including but not necessarily limited to $O_2$ created from the separation of water into $H_2$ and $O_2$, e.g., by electrolyzer 10 in a cathode chamber (e.g., a cathode chamber 131 of cathode 130) of a fuel cell (e.g., fuel cell 100), the reaction activity at the cathode is increased and the degree to which the reaction is cathode limited is either reduced or eliminated. This may, among other things, allow decreased cathode catalyst loading (an important issue because fuel cell catalysts are often comprised at least in part of platinum group metals, which are very expensive), or enable the use of catalysts that are less active and less expensive. Also, the increase in relative oxygen concentration allows an ability to increase the power output of a fuel cell (e.g., fuel cell 100) above an initial manufacturer output capacity on at least an intermittent basis. An increased power output per unit time may result from the increase in oxygen concentration at the cathode and thus a higher efficiency of the electricity generating system 9 and the system (e.g., system 5) as a whole. Further, the ability to intermittently increase an electrical output due to the increase in oxygen content may allow one to purchase and commission a smaller, and less expensive fuel cell system when only a temporary higher output is required instead of utilizing a fuel cell with a higher power output but rarely using its full capability.

Further, in cases where an energy storage system (e.g., system 5) includes an electricity producing part (e.g., fuel cell 100) and a fuel production part (e.g., electrolyzer 10) that are symmetrical (that is, where the products of the fuel production part are the exact required chemicals needed by the electricity producing part), the above described increase in oxidant may be deployed to increase the power and efficiency of the electricity producing part (e.g., fuel cell 100), by overcoming oxidant mass flow limitations in the cathode of that part. This improved state can be controlled (e.g., via a controller 180 connected to sensors and/or pumps and/actuators or other flow control devices) to happen temporarily or at all times when both parts of the larger system are operational, or at all times when only the electricity power producing part is operational. In addition, such a controller can adjust and set the level of oxygen enhancement in the oxidant stream, for example, from use of ambient air (0% oxygen from fuel production part, including electrolyzer 10) to the use of substantially pure or pure oxygen (no air) in the oxidant stream that is introduced to the cathode (e.g., cathode chamber 131) of the fuel cell 100.

In certain circumstances oxygen may be ported directly from electrolyzer 10 to cathode chamber 131 130 of fuel cell 100 via bypass 105 or other fluidic connection. Alternatively, the use of an oxygen storage tank (e.g., oxidant storage tank 60 receiving oxidant from electrolyzer 10) where oxygen is stored at positive pressure, allows for rapid introduction of oxygen into a cathode chamber (e.g., cathode chamber 131 of cathode 130) of the fuel cell (e.g., fuel cell 100), and displacement of ambient air from the cathode (e.g., cathode chamber 131) of the fuel cell (e.g., fuel cell 100). Those skilled in the art will recognize that a supplemental oxidant storage tank is not typically present in a fuel cell system where ambient air is readily available, as most existing fuel cell systems are designed to operate at ambient oxygen concentrations, potentially with flow control devices such as pumps and fans. However, in a system (e.g., system 5) where an electrolyzer (e.g., electrolyzer 10) is used to generate hydrogen, oxygen is also produced, and can be compressed and stored in a commercially feasible manner in order to facilitate enhanced fuel cell reactions (e.g., in fuel cell 100), without having to procure an independent supply of oxygen. In existing systems, the costs (economic, weight and volume) of additional components required to obtain additional oxidants outweigh the benefits of incorporating such components. In this invention, the matter of isolating and storing oxidant is simpler based on the generation of oxygen by the electrolyzer (i.e., electrolyzer 10), and relative ease of capture and compression of the oxygen using commercially available components. Commercial units that carry a "rechargeable" or replaceable chemical oxidant supply are only typically offered for undersea or space applications, where air is not available.

As indicated, energy must be expended in order to separate an oxidant and reactant from a fuel stream (e.g., via electrolyzer 10). Thus, there are energy losses related to a separation of the components from the fuel carrying stream (i.e., in the electrolyzer), and there are additional losses associated with an amount of electricity derived from a reaction of those components in a fuel cell (e.g., fuel cell 100) to generate electricity, as well as the functioning of the balance of a system (e.g., system 5) as a whole. Such losses, when taken together reduce the "round trip efficiency" of the system—i.e., the net of the electricity generated less the parasitic losses associated with the separation, storage, and recombination of hydrogen and oxygen to generate electric current. Round trip efficiency is, as a practical matter always below 100%, however a system (e.g., system 5) may be economically acceptable, provided that it is possible for operator of the system (e.g., system 5) to purchase electricity to operate fuel generating portion of the system at cost that is low enough, and to sell hydrogen or electricity at a high enough price to offset such efficiency losses.

Fuel cells (e.g. fuel cell 100) include catalysts to allow a reaction to occur between a fuel (e.g., hydrogen) and an oxidant (e.g., ambient air or $O_2$) The compositions of such electrocatalysts, and especially those in a cathode, are frequently Pt-based materials. Due to this, one of the largest losses of an operating fuel cell is the voltage loss experienced at the cathode. These losses typically comprise 67% of the total losses experienced by a fuel cell (i.e., 400 mV of 600 mV lost) as shown in FIG. 1. of "*Activity benchmarks and requirements for Pt, Pt-alloy, and non-Pt oxygen reduction catalysts for PEMFCs*", Applied Catalysis B: Environmental 56 (2005) 9-35. H. A. Gasteiger et al. Similar curves are found for other types of fuel cells that operate on $H_2$ and $O_2$; for example, solid oxide fuel cells, phosphoric acid fuel cells.

In calculating the expected power and efficiency improvement of the present invention, one may look at a difference of operating voltage of a fuel cell with and without the invention operating. In the Gasteiger et al. reference above, using ambient air at a cathode thereof, at 1.4 A/cm2 operating current, the voltage of the operating fuel cell is 0.59 V. Therefore, power output (=V×A)=0.826 W/cm2. In another example, this fuel cell (e.g., fuel cell 100) may use $O_2$ derived from an electrolyzer (e.g., electolyzer 10) output at a cathode thereof as described above at 1.4 A/cm2, the operating voltage will be 400 mV higher, or 0.99V. Therefore, power output (=V×A)=1.386 W/cm2 which would be a 67% improvement in voltage output over the example described using ambient air.

Thus, the addition of oxygen from an electrolyzer instead of ambient air to a fuel cell as described may result in an improvement in size and cost required to serve a given electrical power need. It also results in an ability for power production over the presumed output of a given fuel cell. Finally, it also results in fuel savings when operating at or below specified capacity.

Thus, the use of such an oxidant (e.g., O2) derived from an electrolyzer according to the example described would result in an improvement in a power output and/or efficiency of up to 67 percent relative to an existing fuel cell otherwise using ambient air as an oxidant at a cathode (e.g., in cathode chamber 131) thereof. In other words, a 1 MW fuel cell can be operated to produce 1.67 MW on at least an intermittent basis. On the other hand, the same 1 MW fuel cell can be operated with a fuel savings of 67% by operating the invention. The needs of a 1.67 MW application can be served by a smaller, less expensive 1 MW fuel cell, when operated with this invention.

As described above, in an example an oxidant may be transmitted within system 5 via a series of conduits (e.g., an input conduit 200) and valves and/or pumps (not shown) controlled by a controller (e.g., controller 180) and one or more sensors. Sensors may be provided at inputs (e.g., inlet 140, inlet 110) and outlets (outlet 125, outlet 135) and/or within anode 120 or cathode 130 to allow a determination of an amount of oxidant, fuel, water and/or temperature at these locations. The controller may cause a flow of the oxygen as determined by one or more predetermined criterion or parameter or array of criteria or parameters (e.g., determinations by sensors of a temperature, oxygen level, fuel level, water level, humidity, membrane resistance, cost and price of electricity as determined by the power provider, etc.). Such control of valves and/or pumps may also be initiated manually using systems that are known to those skilled in the art. Hydrogen may be similarly transmitted from electrolyzer 10 and hydrogen storage tank 50 to fuel cell 100 (e.g., input 110) using flow control devices known to be appropriate to those skilled in the art.

In an undepicted example, electrolyzer 10 may be replaced in system 5 by another apparatus for producing or otherwise providing a stored oxidant that may be provided to a cathode inlet (e.g., cathode inlet 140) of a fuel cell (e.g., fuel cell 10). Examples of such apparatuses include but are not necessarily limited to a commercial oxygen concentrator, commercial oxygen generator, biological fuel cell or biologic energy conversion device, or an industrial process that creates oxygen in a manner that is economically efficient. Such an apparatus could also produce fuel (e.g., hydrogen) for the fuel cell or fuel be obtained in another manner, such as collection from a biomass gasifier, wastewater treatment plant, or other process known to those skilled in the art. Further, electrolyzer 10, or another apparatus for producing a fuel (e.g. hydrogen gas) and an oxidant (e.g., oxygen gas), may generate products that can be used in a different manner, such as for transportation, or for use in industry. In an example, electrolyzer 10 could provide hydrogen for use in an on-site filling facility to be provided to a hydrogen powered vehicle while oxygen may be produced and stored for transport for industrial process use. In another example, hydrogen generated by electrolyzer 10 may also be placed into a portable storage plenum (e.g., a tank truck) and sold as an industrial gas.

Fuel cell 100 may be a fuel cell system known to those skilled in the art, including a plurality of fuel cells configured as a fuel cell stack and configured to produce electrical current having a given voltage and current output as necessary or desirable. In the example shown in FIG. 1, only a single of fuel cell 100 is illustrated for the sake of simplicity. However, in reality, a plurality of fuel cells may be provided, which can be coupled together in series, parallel or a combination of series/parallel arrangements. More particularly, one or more instances of fuel cell 100 may be present in a fuel cell system, such as fuel cell system 100 as seen in FIG. 1.

The controller (i.e., controller 180 described above, could be any type of computing unit (e.g., a personal computer operating a WINDOWS operating system or Apple OSX operating system, a Unix system, a microprocessor (which may or may not utilize a BIOS or operating system), an application specific integrated circuit (ASIC), a mobile computing device such as a tablet computer or smart phone) configured to communicate with and/or control electrolyzer (e.g., electrolyzer 10), a fuel cell (fuel cell 100), sensors located on portions of the fuel cell including the plates thereof, an energy storage device, a balance of a plant, a fuel supply (e.g., a source of oxidants or fuel), a fan valves, flow control components, a blower and/or a load. Further, the controller (e.g., controller 180) could be a unit separate from the sensors, fan, blower, fuel cell stack, energy storage device, and load device. Moreover, such a controller could be part of one or more of these components (e.g., the sensors, fan, blower, fuel cell, load device, and energy storage device) and could be distributed between these devices and other connected systems, such as the balance of plant while the distributed portions of such controller could be coupled to each other to allow communication therebetween.

The load described above (e.g., load 170) could be any type of stationary or moveable load device that can be electrically coupled to system. This expressly includes but is not limited to, an industrial electrical vehicle or forklift truck, battery charger, a cell tower backup power supply, one or more buildings, a grid tied energy storage system, an over-road vehicle or any other electrical load. The fuel cell (e.g., fuel cell system 100) could be any type of fuel cell such as a proton exchange membrane fuel cell, solid oxide fuel cell, or any other fuel cell as would be known by one of ordinary skill in the art. The energy storage devices described above could be any type of battery or other way of storing energy such as a lithium ion battery, lead acid battery, air compression energy storage device, water storage device, capacitor, ultra-capacitor, or any other device for storing energy.

In an example depicted in FIG. 2, a process for generating a fuel and generating electrical current is provided. In a step 200, water and electrical current may be provided to electrolyzer 10 as controlled by a controller (e.g., controller 180) to generate hydrogen and oxygen. The resulting hydrogen and oxygen may be directed to the fuel cell system 100 for immediate consumption and/or stored in storage tanks 50 and 60 as described above. Alternatively, the hydrogen and oxygen may be directed as controlled by the controller to other uses such as hydrogen to a hydrogen vehicle filling station and oxygen to industrial uses in a step 210. In one embodiment, oxygen may be vented to facilitate aerobic digestion of biomatter in a wastewater treatment facility. Finally, the oxygen may be vented to the ambient environment. The controller may cause the movement of the water, oxygen and hydrogen as well as managing any temperature control systems or components by opening and closing valves and controlling fans, blowers and pumps.

In a step 220, ambient air may be provided from an ambient air source to cathode input 140 of cathode 130 of fuel cell 100 while hydrogen may be supplied to anode input 110 from hydrogen storage tank 50 or another source of hydrogen including electrolyzer 10, in a step 230, as directed by fans, valves and/or pumps controlled by the controller.

A sensor 132 in communication with controller 180 may determine an amount of oxygen in cathode 130 in a step 240 and controller 180 may compare the amount to a parameter. Parameter may be preset or dependent on the desired operating characteristics of system 5, and the oxygen concentration in the fuel cell (e.g., fuel cell 10) may be adjusted in order to achieve those characteristics. By way of example, and not limitation, if it is desirable to operate the fuel cell (e.g., fuel cell 10) at a higher power output (i.e. more current generated per time) then it may be desirable to increase the concentration of oxygen at the cathode aspect (e.g., cathode 130) of fuel cell system 100. More specifically, and again as a non-limiting example, if load of 33% higher than baseplate is required, or in the separate case that 33% diminution in hydrogen flow is required, then additional oxygen feed is provided such that oxygen concentration increases from 21% (ambient air) to 61%. In response to the amount of oxygen being below the predetermined parameter, controller 180 (via fans, blowers and/or valves, for example) may cause a flow of oxygen from oxidant storage tank 60, or directly from electrolyzer 10, to cathode input 140 to increase an oxygen concentration in cathode 130 in a step 260. As described above such an increase in an oxygen concentration in a flow through cathode 130 may increase an output of electrical energy due to a typical fuel cell reaction being cathode limited in nature. A voltage output from fuel cell 100, or a resistance of a membrane in fuel cell 100, determined by a sensor(s) could also result in an adjustment in the flow of oxidant from tank 60 and/or ambient air being adjusted. The process described may, on a continuous basis return to step 240 to ensure that it is continuously operating in a manner that is correspondent with system 5 to meet the load requirements via electrical outlet 160 and make adjustments to cathode oxygen concentration as necessary.

At step 270, a concentration of oxygen in the oxidant flow from oxidant storage tank 60, or directly from electrolyzer 10, to cathode input 140, may be adjusted after a predetermined time period or after the controller receives an indication from a sensor (e.g., sensor 132) and compares it to a parameter such as temperature, water content or concentration of oxygen in cathode 130 (e.g., in cathode chamber 131) is at a second predetermined level. Parameters may be predetermined, calculated based on operating conditions, or both. In a different example, the flow of oxidant from oxidant storage tank 60 and an ambient air source (e.g., source 150) may be adjusted based on an output of electrical energy at output 160 or a sensor 122 detecting a particular amount of hydrogen in anode 120. A voltage output from fuel cell 100, or a resistance of a membrane in fuel cell 100, determined by a sensor(s) could also result in an adjustment in the flow of oxidant from tank 60 and/or ambient air being adjusted. The described process may, on a continuous basis return to step 240 to ensure that it is continuously operating in a manner that is correspondent with system 5 to meet the load requirements via electrical outlet 160 and make adjustments to cathode oxygen concentration as necessary.

In another non limiting example, the oxygen may be provided from oxidant storage tank 60 to cathode chamber 131 of cathode 130 to increase the fuel cell 100 activity to provide electrical power more quickly than if the oxygen was not provided (e.g., if ambient air only was provided to cathode 130). In one embodiment, oxygen may be provided to cathode aspect (e.g., cathode 130) of fuel cell 100 at start up of a fuel cell 100. Also, the oxygen may be provided from oxidant storage tank to cathode 130 when additional electrical current or voltage is needed by system 5 to provide to a particular load or increase in load. The oxygen may be provided from oxidant storage tank to cathode 130 for a limited period of time, after which flow may stop or be reduced from the oxidant storage tank and ambient air may replace or may provide a larger part relative to the flow from the oxidant storage tank.

In a further example, a controller (e.g., controller 180) may direct a flow of hydrogen from an electrolyzer (e.g., electrolyzer 10) or from hydrogen that is stored in bypass 55 and/or a hydrogen storage tank (e.g, hydrogen storage tank 50) in response to a measurement or determination of a sensor connected to the electrolyzer or a fuel cell (e.g. fuel cell 100). By way of example and not limitation, controller 180 may cause additional hydrogen to be introduced to the anode aspect (e.g., anode 120) of the fuel cell (e.g., fuel cell 100) in response to an increase in the demand from the electrical load (e.g., load 170). Similarly, controller 180 may decrease the amount of hydrogen being introduced in response to a diminished load, or in response to a fuel cell (e.g., fuel cell 100) that is operating efficiently.

Finally, system 5 itself may be used to adjust the temperature of the fuel cell 100 by reacting hydrogen and oxygen in a manner that will increase the temperature of system 5. For example, a temperature sensor detecting an anode or cathode temperature at a lower than desired temperature which is set as a preset parameter could cause the controller to flow an additional amount of hydrogen to an anode (e.g., anode 120) of the fuel cell to increase a reaction in the fuel cell (e.g., fuel cell 100), while increasing the oxygen concentration at the cathode aspect (e.g., cathode 130) of fuel cell 100 to greater than that of ambient air by introducing oxygen from electrolyzer 10 or oxidant storage container (e.g., oxidant storage tank 60) into a cathode (e.g., cathode 130) of a fuel cell (e.g., fuel cell 100).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

For the purposes of promoting an understanding of the principles of the invention, reference is made above to embodiments of the invention and specific language describing the same. It will nevertheless be understood that no limitation of the scope of the invention is thereby intended, and any alterations and further modifications in the described embodiments, and any further applications of the principles of the invention as illustrated therein as would normally occur to one skilled in the art to which the invention relates are contemplated and protected.

What is claimed is:

1. A system comprising:

an electrolyzer coupled to a source of water and a power source, said electrolyzer configured to generate hydrogen and electrolyzer oxygen utilizing water from the water source and electrical power from the power source;

a fuel cell system coupled to the electrolyzer to receive a flow of the hydrogen from the electrolyzer at an anode thereof;

the fuel cell system coupled to an electrical load to provide electrical power thereto;

the fuel cell system comprising a cathode having a cathode chamber coupled to a source of ambient air;

an oxidant storage tank in communication with an outlet of the electrolyzer and receiving the electrolyzer oxygen from the electrolyzer, the electrolyzer oxygen having a higher concentration of oxygen than the source of the ambient air;

the oxidant storage tank coupled to the cathode chamber to allow a flow of the electrolyzer oxygen from the oxidant storage tank to the cathode chamber:

a fuel cell oxidant concentration sensor located in-said cathode and configured to determine a measured concentration amount of oxygen in said cathode of said fuel cell; and a controller coupled to said sensor and configured to control a blower to cause a flow of the electrolyzer oxygen from the oxidant storage tank into the cathode chamber of the fuel cell in response to the controller determining that a cathode reaction of the fuel cell is-oxygen limited based on the measured concentration amount of the oxygen determined by the sensor being compared to a predetermined oxygen concentration parameter, such that the electrolyzer oxygen substitutes for an amount of the ambient air from the source of ambient air to cause a concentration of oxygen in the cathode to be increased to a relative concentration greater than that of the ambient air by the flow of the electrolyzer oxygen by the blower controlled by the controller to cause an increase in a power output of the fuel cell; and the controller configured to control the blower to reduce the flow of the electrolyzer oxygen from the oxidant storage tank in response to a second measured concentration amount of oxygen in said cathode of said fuel cell and a second comparison of the second measured concentration amount to the predetermined oxygen concentration parameter.

2. The system of claim 1 further comprising an operational parameter sensor located in a portion of said fuel cell and configured to determine an operational parameter of said fuel cell.

3. The system of claim 2 wherein said controller is coupled to said operational parameter sensor and configured to cause a flow of the oxygen from the electrolyzer to the cathode of the fuel cell in response to the operational parameter being compared to a pre-determined criteria.

4. The system of claim 3 further comprising a fluid control device for selectively controlling the flow of ambient air from the source of ambient air to the cathode chamber.

5. The system of claim 1 wherein the electrolyzer is fluidically connected to a vehicle hydrogen filling station to provide hydrogen produced by the electrolyzer to fuel hydrogen tanks of vehicles.

6. The system of claim 1 further comprising a hydrogen fueling station coupled to the electrolyzer to receive a second flow of the hydrogen from the electrolyzer and configured to allow a filling flow of hydrogen from the filling station to a hydrogen tank of a vehicle.

7. A system comprising:

an electrolyzer coupled to a source of water and a power source, said electrolyzer configured to generate hydrogen and electrolyzer oxygen utilizing water from the water source and electrical power from the power source;

a fuel cell system coupled to the electrolyzer to receive a flow of the hydrogen from the electrolyzer at an anode thereof;

the fuel cell system coupled to an electrical load to provide electrical power thereto;

the fuel cell system comprising a cathode having a cathode chamber coupled to a source of ambient air;

an oxidant storage tank in communication with an outlet of the electrolyzer and receiving the electrolyzer oxygen from the electrolyzer, the electrolyzer oxygen having a higher concentration of oxygen than the source of the ambient air and having a positive pressure when stored in the oxidant storage tank;

the oxidant storage tank coupled to the cathode chamber to allow a flow of the electrolyzer oxygen from the oxidant storage tank to the cathode chamber;

a fuel cell oxidant concentration sensor located in said cathode and configured to determine a measured concentration of oxygen in said cathode of said fuel cell; and a controller coupled to said sensor and configured to control a flow control device to cause a flow of the electrolyzer oxygen at the positive pressure from the oxidant storage tank into the cathode chamber of the fuel cell in response to the controller determining that a cathode reaction of the fuel cell is oxygen limited based on the measured concentration of the oxygen determined by the sensor being compared to a predetermined oxygen concentration parameter, such that the electrolyzer oxygen substitutes for an amount of the ambient air from the source of ambient air to cause a concentration of oxygen in the cathode to be increased to a relative concentration greater than that of the ambient air by the flow of the electrolyzer oxygen at the positive pressure by the flow control device controlled by the controller to cause an increase in a power output of the fuel cell; and the controller configured to control the flow control device to reduce the flow of the electrolyzer oxygen from the oxidant storage tank in response to a second measured concentration of oxygen in said cathode of said fuel cell and a second comparison of the second measured concentration to the predetermined oxygen concentration parameter.

8. The system of claim 7 wherein the flow control device comprises one or more valves controlled by the controller to cause the flow of the electrolyzer oxygen at the positive pressure.

* * * * *